United States Patent [19]

Levenson et al.

[11] Patent Number: 5,052,114

[45] Date of Patent: Oct. 1, 1991

[54] GOLFERS OPTICAL ALIGNMENT INSTRUMENT

[76] Inventors: Howard A. Levenson, 326 Mountain View Ave., San Rafael, Calif. 94901; James H. Smith, Jr., 132 Medinah Pl., San Ramon, Calif. 94583

[21] Appl. No.: 493,195

[22] Filed: Mar. 14, 1990

[51] Int. Cl.$^5$ ............................................. G01C 15/12
[52] U.S. Cl. ....................................... 33/286; 33/508; 33/262; 33/277
[58] Field of Search ................. 33/508, 286, 289, 277, 33/276, 227, 278, 262; 434/252; 273/183 E, 35 A, 187 A, 163 R; 350/169, 170, 171, 146, 144, 253, 254, 399

[56] References Cited

U.S. PATENT DOCUMENTS 4,415,159  11/1983  Matheny et al. ............. 273/35 A X
4,908,948   3/1990  Gormley ...................... 33/286 X Primary Examiner—Harry N. Haroian

[57] ABSTRACT

A golfing instrument that allows two dissimilar objects, one object presented to the right eye, and the second object presented to the left eye to be seen simultaneously by the golfer, which allows the golfer to align the intended target that the golf ball will travel to be aligned perpendicular to a line crossing the golfer's shoe tips.

3 Claims, 2 Drawing Sheets

0
GOLFERS OPTICAL ALIGNMENT INSTRUMENT

BACKGROUND OF THE INVENTION

1. Field of the Invention

The invention relates generally to an instrument for the improvement of golfing by the use of mirrors and scribe lines as guides to align the golfer's shoe tips on a horizontal scribe line seen by one eye, and the intended target for the golf ball to travel that is seen by the other eye and aligned on a vertical scribe line, and seen by the golfer simultaneously as a vertical scribe line extending perpendicularly to the intended target superimposed perpendicularly to a horizontal scribe line superimposed onto the golfer's shoe tips.

2. Description of Prior Art

Golfing devices currently utilized and/or having patents issued use mirrors which allow only the use of one eye of the golfer at any time while being used. There is no binocular, simultaneous use of both eyes to see the intended target for the ball to travel, and the golfer's shoe tips.

SUMMARY OF THE INVENTION

The invention relates to an instrument that allows the golfer to align his/her shoe tips on a line perpendicular to the intended target of the golf ball using mirrors for simultaneous binocular vision. The object of the invention is to provide an instrument which will allow the golfer to improve the proper golfing stance that utilizes the theory of golf that states that the flight of the golf ball will travel the line which would intersect the shoe tips of the golfer and the intended target.

DETAILED DESCRIPTION OF THE INVENTION

Figure 1:
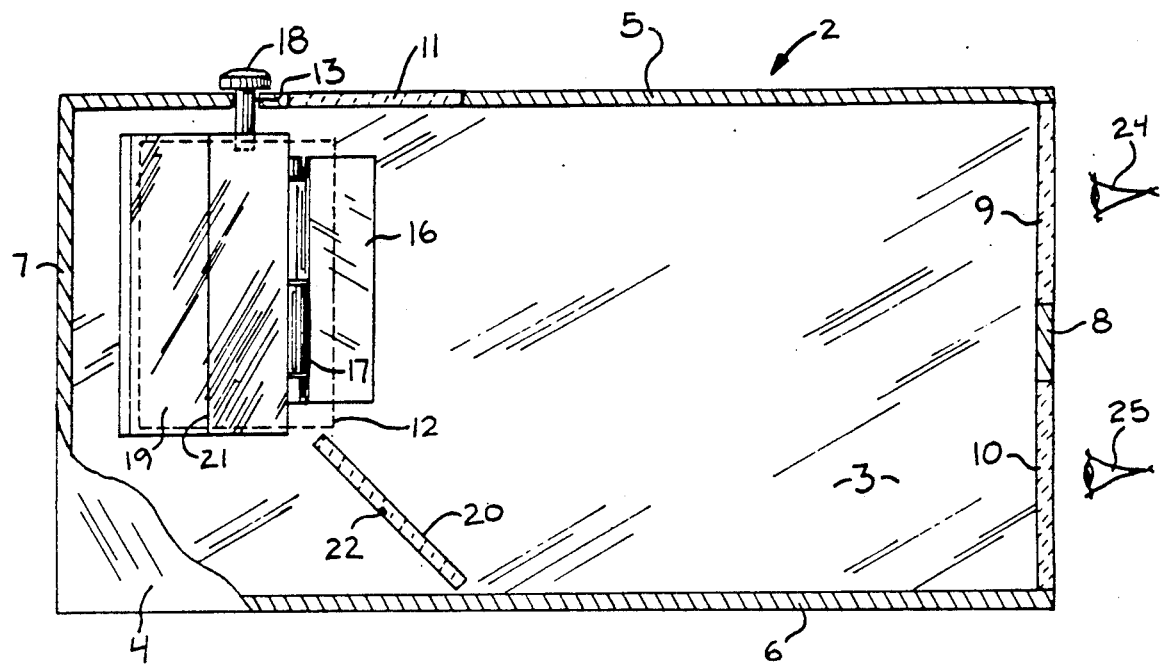
FIG. 1 is an overhead plan view.
Figure 2:
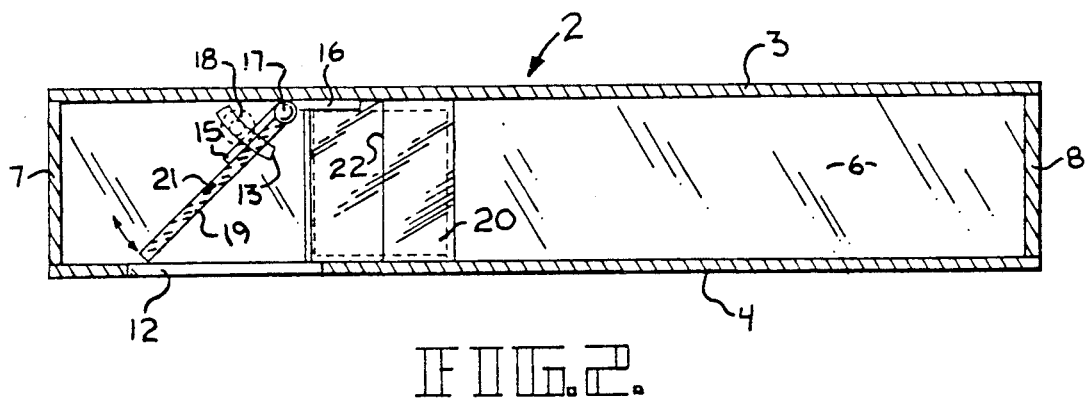
FIG. 2 is a left side vertical view.
Figure 3:
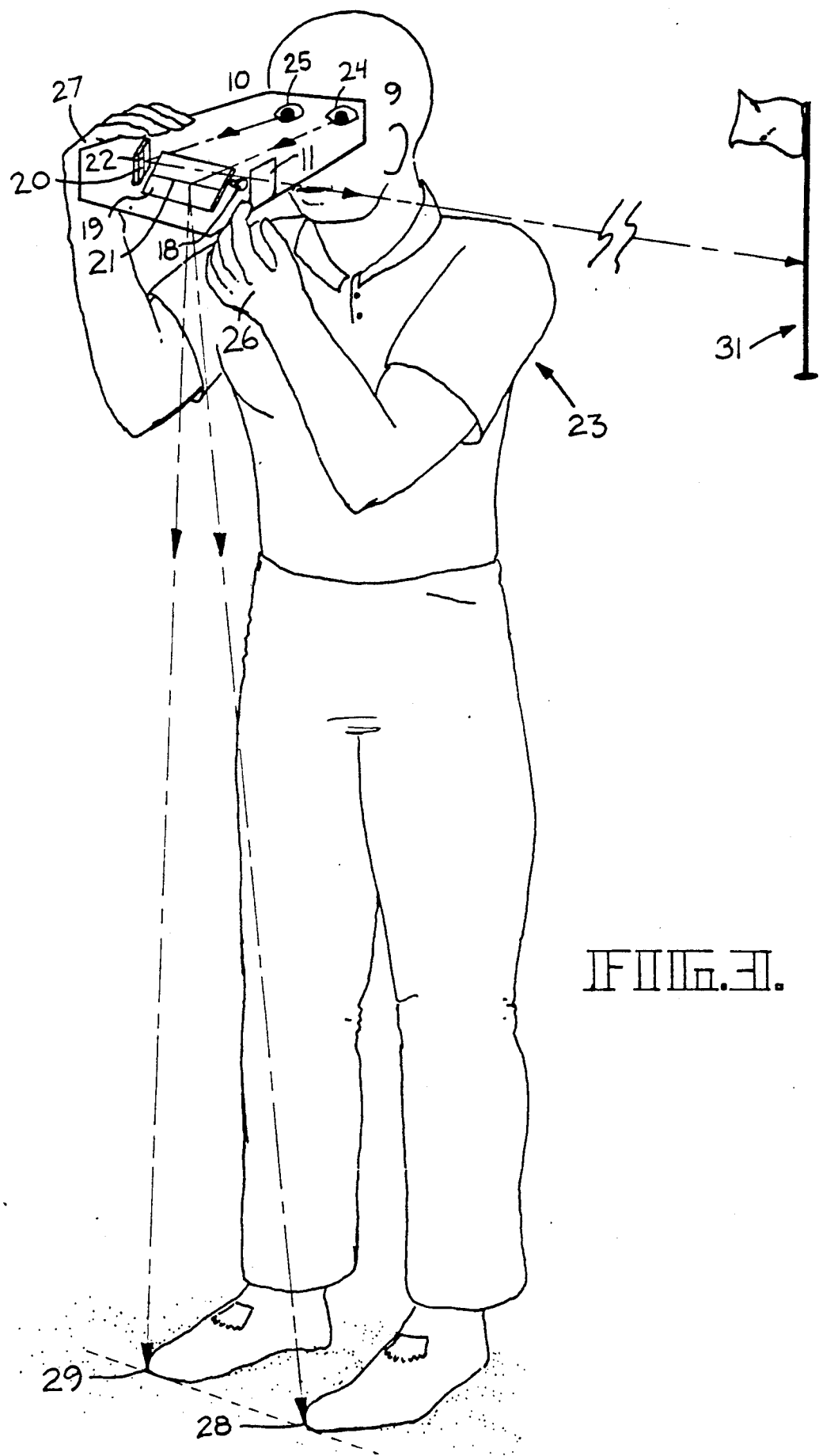
FIG. 3 is a perspective view of a golfer holding the instrument with target or pin to his/her left.

As shown in FIGS. 1 through 3, the viewing device 1 for viewing the golfer's feet and intended target or pin which includes six main parts: (1) the body 2 having a top and bottom, left and right side, front and back; (2) has two openings for viewing 9 and 10; (3) has two reflecting devices 19 and 20; (4) has two scribe lines 21 and 22; (5) has two windows 11 and 12; and (6) has an adjustment mechanism 18.

The mounting or body 2; has a flat rectangular plate 3, and a lower flat rectangular plate 4 which has a rectangular flat transparent window 12, and a left side flat rectangular plate 5 which has a flat transparent window 11, and a right side flat rectangular plate 6. The mounting or body 2, has a front flat rectangular plate 7, a rear flat rectangular plate 8 which has a transparent window 9 and a transparent window 10. The left side flat rectangular plate 5 has an opening 13.

On the bottom side of top plate 3, rectangular plate 16 of hinge is secured. Rectangular plate 15 is part of hinge 17 and rectangular plate 15 is able to rotate less than ninety degrees around hinge 17.

The mounting or body 2, has a viewing window 9 for the left eye 24, and a viewing window 10 for the right eye 25.

A window 11 in the left side plate 5 allows viewing by golfer 23 of intended target or pin 31 by reflection of target or pin 31 in mirror 20 located on side plate 6. Mirror 20 is permanently set at forty five degrees to inside base of side plate 6. A window 12 in bottom plate 4 allows viewing of left shoe tip 28 and right shoe tip 29 of golfer 23, by reflection of left shoe tip 28 and right shoe tip 29 in mirror 19, secured to hinge plate 15, to be viewed through window 12 in plate 4 by left eye 24 of golfer 23. Horizontal line 21 is parallel to front of plate 7 and is located on the back side of mirror 19 (so as not to produce a double image of horizontal scribe line 21). The reflection of left shoe tip 28 and right shoe tip 29 of golfer 23 can be aligned perpendicular to scribe line 21.

The vertical scribe line 22 is located on the back side of mirror 20 and is perpendicular to plate 3 (so as not to produce a double image of vertical scribe line 22). The reflection of target or pin 31 can be superimposed on scribe line 22 so reflection of target or pin 31 can be viewed as vertical by golfer's right eye 25.

Window 11 is transparent and is located in side plate 5. The reflecting image of target or pin 31 moves through window 11 to mirror 20 reflecting image through window 10 to right eye 25 of golfer 23.

Window 12 is transparent and is located in the bottom plate 4. The reflecting image of shoe tips 28 and 29 of golfer 23 moves through window 12 to mirror 19 reflecting image 28 and 29 through window 9 to left eye of golfer 23.

Adjusting pin 18 which is attached to plate 15 extends through opening 13 in plate 5 to allow golfer 23 to adjust mirror 19 by golfer's 26 left hand forefinger and thumb respectively moving pin 18 away from or to golfer 23 thereby aligning tip of golfer's left shoe tip 28 and tip of golfer's right shoe tip 29 perpendicular to horizontal scribe line 21.

Viewing device 2 is being held by golfer's fingers of right hand 27 on top of plate 3 and golfer's thumb of right hand 27 under bottom of plate 4 as viewing by golfer 23 through viewing device 2 takes place.

We claim:

1. A golfer's optical alignment instrument, for determining the alignment of the shoe tips of a golfer with a line that perpendicularly intersects a second line that intersects a desired target determined by the golfer comprising a hollow mounting body containing a left eye transparent viewing window, a horizontal mirror within the body and a transparent window in the bottom wall of the body that allows the golfer to view the golfer's shoe tips reflected from the horizontal mirror after the image of the shoe tips has passed through the transparent viewing window, a right eye transparent viewing window, a vertical mirror within the body adjacent right side of the body and a transparent window in the left side of the mounting body that allows the right eye of the golfer to view the golfer's intended target reflected from the vertical mirror after the image of the target has passed through the transparent window.

2. A golfer's optical alignment instrument as defined in claim 1 in which the horizontal mirror within the hollow mounting body of the instrument is mounted on a moveable hinge surface that has an adjustment pin, attached to the hinge surface, that extends through a hole on the right side of the instrument allowing the adjustment pin to by moved by the golfer to adjust the horizontal mirror for viewing the shoe tips of the golfer; said fixed vertical mirror mounted at 45 degrees to the right side of the inside of the instrument body that allows viewing of the intended target or pin of the golfer.

3. A golfer's optical alignment instrument as defined in claim 1 in which there are horizontal and vertical scribe lines placed on the back surfaces of each mirror allowing the golfer to view the golfer's shoe tips and to align them on the horizontal scribe line of the horizontal mirror, and to view the golfer's intended target and align it on the vertical scribe line of the vertical mirror allowing the golfer to view the alignment of the vertical scribe line as it perpendicularly intersects the horizontal scribe line.

* * * * *